Patented Sept. 22, 1936

2,054,807

UNITED STATES PATENT OFFICE 2,054,807

CARBOXYLIC ACIDS AND METHOD FOR THEIR PREPARATION

Gilbert B. Carpenter, Framingham, Mass., assignor to E. I. du Pont de Nemours & Company, Wilmington, Del., a corporation of Delaware No Drawing. Application January 6, 1932, Serial No. 585,157

5 Claims. (Cl. 260—116)

This invention relates to a process for the formation of organic compounds and particularly to the preparation of monocarboxylic acids by the interaction of aliphatic alcohols and carbon monoxide in the presence of a catalyst.

It is known that organic acids and esters can be prepared by the interaction, in the vapor or liquid phase, of organic compounds with the oxides of carbon. For example, it has been shown that by the condensation of methyl alcohol with carbon monoxide in the presence of a suitable catalyst, acetic acid, methyl acetate, and methyl formate may be prepared in proportions which are governed by the particular operating conditions. Acids have likewise been prepared from methane and carbon monoxide, from carbon monoxide and water vapor, and from ethers and carbon monoxide. Investigators have experienced considerable difficulty in their attempts to find, for these reactions, a catalyst which under given operating conditions would produce, for an extended period, a good space-time-yield of the acid or other compounds desired. Some of the catalysts which have been suggested include the hydrogenating and hydrating catalysts alone or in combination, metal acetate catalysts which split off acetic acid under 450° C., and acid catalysts, such as phosphoric acid and its acid salts.

There are numerous disadvantages in the employment of the aforementioned catalysts, however. For instance, when the hydrogenating and hydrating catalysts are employed, particularly if acetic acid is the desired end product, but low yields of the acid result. With a metal acetate catalyst which decomposes to split off acetic acid, frequent reactivation is required which renders their use uneconomical from a commercial standpoint. When the liquid acid catalysts are used, difficulties in supporting them and maintaining their initial activity are encountered.

An object of this invention is to provide a process for the preparation of higher molecular weight organic compounds thru the introduction of carbon monoxide into the lower molecular weight organic compounds. A further object of this invention is to provide a process for the preparation of monocarboxylic acids by the condensation of an aliphatic alcohol with a carbon oxide in the presence of a catalyst. Another object of this invention is to provide a process for the preparation of acids having the structural formula: $C_nH_{2n+1}COOH$— from alcohols having the structural formula: $C_nH_{2n+1}OH$— by subjecting the alcohols to the action of the carbon monoxide in the presence of a catalyst. Other objects will hereinafter appear.

The above objects may be realized by passing a vaporized monohydroxy aliphatic alcohol and carbon monoxide under suitable temperature and pressure conditions over a boron phosphate catalyst. This catalyst may be supported or not, as desired, altho generally it is preferable to support it on the usual type of catalyst support, such, for example, as charcoal, fuller's earth, kieselguhr, etc.

The alcohol-carbon monoxide reaction which can be accelerated by the above described catalysts may be expressed as follows:

$$C_nH_{2n+1}OH + CO \rightarrow C_nH_{2n+1}COOH$$

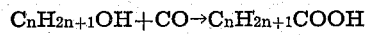

In accordance with the particular operating conditions, it will be found that, in some instances, the acid may not be formed directly in the free state, but may be produced as the ester of the alcohol. The alcohols used may be replaced, if desired, wholly or partly by the corresponding alkyl ethers of the alcohols, such as dimethyl ether, diethyl ether, or the mixed alkyl ethers, the alkyl esters, the alkyl amines,—methylamine, ethylamine, etc., or the alkyl halides,—methyl chloride, ethyl bromide, etc.

The synthesis can generally be efficiently carried out under the following operating conditions. The pressure may vary from approximately 25 atmospheres to 900 atmospheres or higher with the preferable operating range in the neighborhood of 350–700 atmospheres. These pressures do not differ materially from those used when other types of catalysts are employed for this synthesis nor do the temperatures vary appreciably from those already known for reactions of this type. For example, the process can be suitably carried out, with my catalyst, at temperatures of between 200–400° C., but still higher or lower temperatures may also be used in some cases, the speed of the reaction being increased, as would be expected, by the use of higher temperatures.

The carbon monoxide used may be obtained from various commercial sources, such, for example, as from water gas, producer gas, coke oven gas, etc., but to obtain products of the highest degree of purity it is preferable to remove from such commercial gases the objectionable constituents such as sulfur compounds, metal carbonyls, etc.

The presence of inert gases in the alcohol-carbon monoxide mixture is sometimes desirable. Nitrogen, for instance, has little deleterious effect on the reaction or yield and, in fact, may be advantageously used in order to aid in the temperature control and to prevent too great a conversion of the alcohols and carbon monoxide on one pass thru the conversion apparatus. Other strictly inert gases usually act similarly. It is, of course, understood that instead of introducing methanol itself into the reaction chamber substances or mixtures of substances which decompose by hydrolyzing, for example, to form alcohols or which decompose to form esters or ethers may be employed, but generally we prefer to introduce methanol directly into the gas stream. Experts in this art know that it is advantageous, altho not essential, to have water vapor present during the methanol-carbon monoxide to acetic acid reaction. This is true also when the reaction is conducted with compounds which decompose to give the alcohol and is especially advantageous when the compound is such that it forms the alcohol by hydrolysis.

My process can be conveniently carried out by passing purified carbon monoxide into aqueous methanol maintained at such a temperature that the issuing gases will have the requisite proportion of methanol, carbon monoxide, and a portion of the desired water vapor. It has been found that a gaseous composition, containing an excess of carbon monoxide over the methanol vapor, will give a good yield of acetic acid and its ester on one pass thru a converter, the temperature of the reaction chamber being maintained at approximately 325° C. and the pressure held in the neighborhood of 700 atmospheres.

Not only can methanol be catalyzed in the presence of carbon monoxide and our catalyst to acetic acid or methyl acetate, but the higher alcohols, such as ethyl alcohol, propyl alcohol, butyl alcohol, and even the higher molecular weight alcohols, such, for example, as hexyl alcohol or octyl alcohol, may be similarly converted into an acid having correspondingly one more carbon atom than the alcohol treated. In fact, my process and catalyst may be employed with any of the monohydric alcohols, providing these alcohols volatilize without decomposition under the conditions existing during the reaction. When converting the higher aliphatic alcohols, some of which are not water soluble, and particularly if water is desired in the reaction, it is preferable, generally, to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds I may utilize in lieu of the alcohols the ethers, amines, halides, or esters thereof, the use of which will result in a good conversion with generally some slight modification in the ratio of acid to other products obtained.

I will now describe a specific embodiment of my process but it will be understood that the details therein given and the compounds employed, either as reactants or catalysts, in no way restrict the scope of this invention, but merely illustrate one manner in which my process may be carried out.

Example—A gaseous mixture, containing 80% CO, and 5% each of methanol, water vapor, and hydrogen, was passed at a temperature of approximately 325° C. and a pressure of approximately 700 atmospheres over a boron phosphate catalyst. This catalyst was prepared in the following manner: 7.4 parts by weight of boric acid was dissolved in hot water and the resulting solution mixed with 12.6 parts by weight of 85% phosphoric acid. The volume was then made up to 60 parts with water. Fifty parts by weight of hot activated charcoal was thoroughly impregnated with this solution, at boiling temperature, and the thus impregnated charcoal finally dried at 120° C. The prepared catalyst was then disposed in a reaction chamber suitable for conducting exothermic reactions.

The apparatus, which may be employed for conducting these reactions, may be of any conventional type and preferably one in which the temperature of the exothermic reaction can be readily controlled at the optimum value. Owing to the corrosive action of acetic acid, the interior of the converter and apparatus leading therefrom should preferably be protected. This may be accomplished by using glass or glass-lined apparatus or by plating the inner surfaces of the apparatus with chromium or silver, or using for the construction of this equipment acid-resisting alloy steels containing, for example, molybdenum, cobalt, tungsten, chromium, manganese, or nickel.

From a consideration of the above specification it will be realized that any process in which a carbon oxide is combined with an organic compound giving a product containing an aliphatic acid, and particularly those in which monohydric alcohols are converted to monocarboxylic acids, will come within the scope of this invention when such reactions are accelerated in the presence of the hereinbefore described catalyst.

I claim:

1. In a process for the preparation of oxygenated organic compounds the step which comprises contacting a compound selected from the group consisting of a saturated aliphatic alcohol, and a compound which gives a saturated aliphatic alcohol upon hydrolysis and carbon monoxide in the presence of water vapor with a boron phosphate catalyst supported on activated charcoal.

2. In a process for the preparation of acetic acid the step which comprises contacting methanol and carbon monoxide with a boron phosphate catalyst supported on activated charcoal.

3. In a vapor phase process for the preparation of aliphatic organic acids from carbon monoxide and compounds containing at least one alkoxy group the step which comprises effecting the reaction in the presence of a boron phosphate catalyst supported on activated charcoal.

4. In a process for the preparation of an aliphatic carboxylic acid the step which comprises contacting propanol and carbon monoxide with a boron phosphate catalyst supported on activated charcoal.

5. In a process for the preparation of acetic acid the step which comprises contacting methanol and carbon monoxide with a boron phosphate catalyst supported on activated charcoal and prepared by dissolving approximately 7.4 parts of boric acid in hot water, mixing the resulting solution with approximately 12.6 parts of 85% phosphoric acid and after mixing with approximately 50 parts of activated charcoal drying the resulting catalyst.

GILBERT B. CARPENTER.